United States Patent [19]
Louisiana

[11] Patent Number: 5,711,107
[45] Date of Patent: Jan. 27, 1998

[54] STRUCTURAL SUPPORT SYSTEM FOR PLANTS

[76] Inventor: Gary L. Louisiana, 15871 Plumwood St., Westminster, Calif. 92683

[21] Appl. No.: 456,070

[22] Filed: May 31, 1995

[51] Int. Cl.$^6$ .......................... A01G 17/06; A01G 17/14
[52] U.S. Cl. ................................................ 47/45; 47/47
[58] Field of Search ........................... 47/45 C, 45 R, 47/47 R; 256/19; 403/231

[56] References Cited

U.S. PATENT DOCUMENTS

| | | |
|---|---|---|
| 71,128 | 11/1867 | Bush. |
| 199,353 | 1/1878 | Clark ................................. 47/45 R |
| 306,691 | 10/1884 | Johnson. |
| 641,859 | 1/1900 | Henry ................................. 47/45 C |
| 836,328 | 11/1906 | Maxfield. |
| 963,030 | 7/1910 | Balch ................................. 47/45 C |
| 1,092,217 | 4/1914 | Hopkins ............................. 403/231 |
| 1,487,779 | 3/1924 | Hardy ................................. 47/45 C |
| 2,030,249 | 2/1936 | Goldberg. |
| 2,862,334 | 12/1958 | Sandvig. |
| 2,931,129 | 4/1960 | Boniface ............................ 403/231 |
| 2,997,277 | 8/1961 | Schwartz ............................ 256/19 |
| 3,579,908 | 5/1971 | Morgan. |
| 4,050,187 | 9/1977 | Geiger et al.. |
| 4,260,138 | 4/1981 | Freer .................................. 256/19 |
| 4,329,762 | 5/1982 | Maidhof. |
| 4,483,098 | 11/1984 | Anderson. |
| 4,779,375 | 10/1988 | Harder. |
| 4,881,342 | 11/1989 | Ferguson. |
| 4,907,369 | 3/1990 | Vomfell. |
| 4,922,653 | 5/1990 | Stone ................................. 47/45 C |
| 5,337,514 | 8/1994 | Hiyama et al.. |

FOREIGN PATENT DOCUMENTS

| | | | |
|---|---|---|---|
| 538212 | 7/1921 | France ............................. 47/47 R |
| 2801004 | 7/1978 | Germany .......................... 47/45 C |

Primary Examiner—Terry Lee Melius
Assistant Examiner—Joanne C. Downs
Attorney, Agent, or Firm—Curtis L. Harrington

[57] ABSTRACT

A plant system is preferably made of plastic and even more preferably made of clear acrylic structural members. Such acrylic members take on the color of the surrounding plants and "blend" into the background created by the plants. The acrylic members have abbreviated length attachment members which extend from opposite sides of the structural members, and the attachment members have a differing diameter. The outermost portion has a smaller diameter which facilitates the initial overfitting of a plastic strap having a plurality of apertures. The strap is moved to surround the plant portion to be supported and the other end's aperture is also fitted over the attachment member. The resulting loop extends widely around the plant portion giving it adequate room for growth and further extension through the loop. The system, including the structural members and attachment members can be interconnected using a series of connectors to form a trellis or other support shape.

10 Claims, 6 Drawing Sheets

STRUCTURAL SUPPORT SYSTEM FOR PLANTS

FIELD OF THE INVENTION

The present invention relates to the field of structural supports for plants, vines and the like. More specifically, the present invention relates to a structural system having connectable and removable loops of adjustable length which can be used to support plants and vines without choking off the flow of nutrients which results from pressure tying.

BACKGROUND OF THE INVENTION

Structural elements for supporting plants have been known which include wooden stakes and the like. Staking a plant with a straight length of support material requires jabbing the stake into the ground near the center of the plant's root system, and tying the plant at various heights to the stake. Damage may result to the plant from the jabbing action of the stake, especially where a major root path is severed.

In supporting the plant from the stake, the plant may be secured with twist ties. This action can dig into the plant's vascular system and literally choke off nutrients to the plant. Where the twist tie is applied loosely, it may allow the plant and tie to "slip" downward on the stake and defeat the purpose of introducing the stake to begin with. Other methods of attachment such as rubber bands are difficult to loop around the plant, and will eventually rot.

In most cases, the stake has no appendage to prevent the tying structure from slipping downwardly on the stake. The individual who stakes the plant will try to engage as few ties as possible in order to save time and go on to the next plant. This increases the pressure at the points of engagement on the plant and further places the plant in danger of food and water cutoff, and partial wilting can occur. Thus, especially in commercial applications where the workers are in a hurry, the potential for tying the plant too tight is a real problem.

Even where other structures are provided on the stakes, the potential exists for tying the plants too tightly. Usually these structures have to be added by the user, and will exist in the form of nails, staples or other sharp objects which could not only damage the plant, but injure the user. The addition of these structures adds even more time to the staking operation, as well as some danger.

Other labor additions with regard to the staking activity includes the time to attach sections of stake or to cut longer sections of stake down as needed to conserve stake material. Further, there is a tradeoff between the amount of material to use in a stake for sturdiness, versus the savings in material which will enable proper staking to occur. Since most stake material is made of wood in an unfinished state, the stakes may not last for any length of time, much beyond one staking. As such, the material used may be minimum which will make more difficult the driving of the stakes into the ground. Where the material is especially absent, the stakes may break when being struck into hard ground. The result is a tradeoff which is present due to the choice of materials. Other materials can be used, such as steel rods and the like, but they are simply too expensive, and will eventually rust. Rusting rods can present a hazard to workers, and may spoil some plant environments.

Many of the same disadvantages which relates to a simple staking operation are amplified where a more complex and complete support structure for plants is desired. In the example of the trellis, much more work is required. A trellis is typically used to support a bulky area of a plant over a wide support area. The problems of adequate support and tying are magnified. The result is usually a flat wood structure, having a cross or diagonal cross pattern. The trellis is required to be built to full height before the plant is planted, since the addition of further support as the plant grows is unfeasible.

Further, since the larger portion of the trellis will be exposed during growth, it is usually painted and requires high craftsmanship and must stand alone artistically in addition to providing support for a plant. The result is that the trellis should be purchased in a pre-formed state, since the machinery required is quite specialized. The user can build a trellis with wood, a table saw and paint, but the effort is significant and the cost is high. In either case, such a trellis cannot be driven into the ground, but has to have a special trench dug and then filled in.

Alternatively, other structures can be driven into the ground and bolted to the trellis structure. This again involves precise placement of the support structure, as well as additional materials and equipment to perform the anchoring.

For other applications such as pot plants and barrel plants, a central staking structure is insufficient. Here, the plant owner is faced with the challenge of building an erector set type of structure, and other solutions for attachment of the plant. Solutions which include a series of stakes and string appear amateurish and aesthetically unpleasing. Where the stake and string material is particularly visible, the effect of having the plant in the first place can be negated. In addition, it may be difficult to fashion a support system which follows the growth of the plant so as to maintain inconspicuousness of the plant support.

What is therefore needed is a plant support system which will support staking, trellis and barrel configurations in an aesthetically pleasing way. The desired system will be adjustable without undue activities by the user. The adjustment should enable the user to expand and contract the support system in congruence with the plant system. The needed system should be as unnoticeable as possible. The needed system should provide an adequate number and spacing for tie points. The needed system must enable the securing of the plant to be done in a way which will not injure the plant and in which the plant can grow. Further, the plant attachment system should enable attachability and detachability for rapid re-adjustment as the plant is extended through it as the plant grows.

SUMMARY OF THE INVENTION

The plant system of the present invention is preferably made of plastic and even more preferably made of clear acrylic structural members. Such acrylic members can take on the color of the surrounding plants and "blend" into the background created by the plants. Further, the clear members can be transparently colored to give different transparent hues to accent adjacent plants. Of course, the members can be solidly colored to give a high sheen brilliantly decorative look. The acrylic members have abbreviated length attachment members which extend from opposite sides of the structural members.

The attachment members have a differing diameter. The outermost portion has a smaller diameter which facilitates the initial overfitting of a plastic strap having a plurality of apertures. The strap is moved to surround the plant portion to be supported and the other end's aperture is also fitted over the attachment member. The resulting loop extends widely around the plant portion giving it adequate room for growth and further extension through the loop.

The system, including the structural members and attachment members can be interconnected using a series of connectors to form a trellis or other support shape. The system members are intended to be permanent, but reconfigurable. In this fashion, structural members will always be available to afford quick replacement and add-on. The system includes connectors which enable a variety of different shapes.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
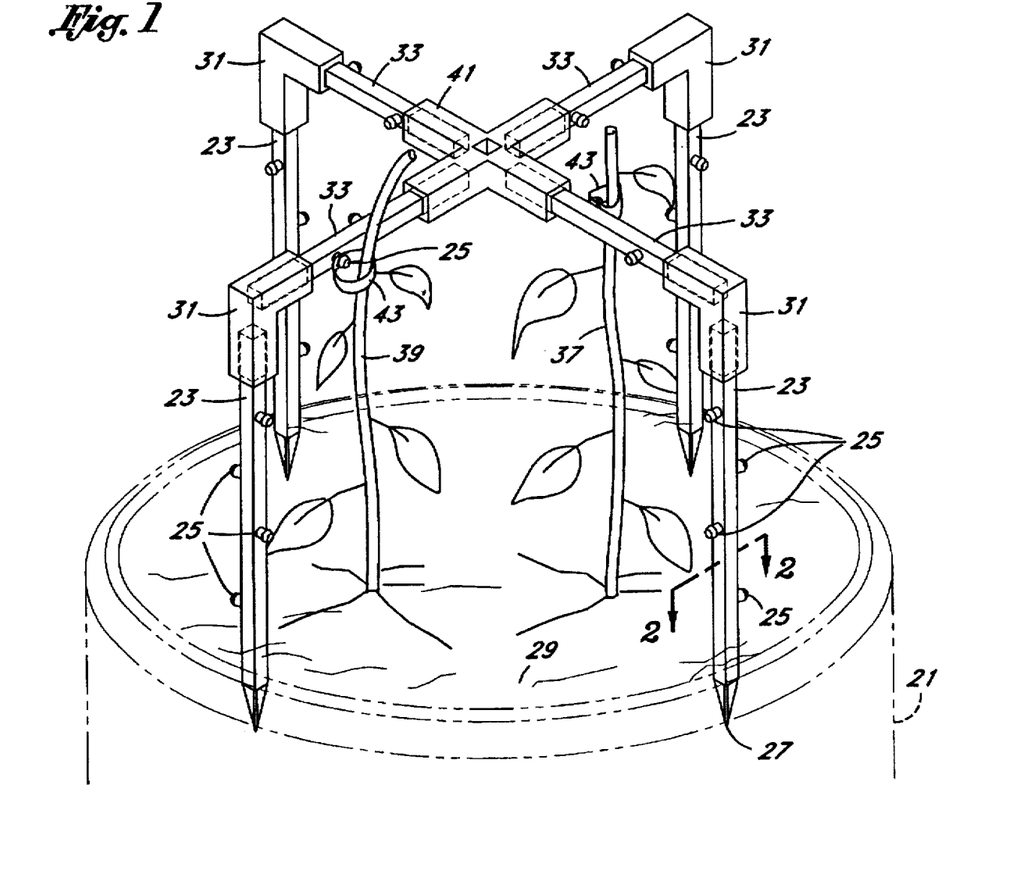
FIG. 1 is a perspective view of the plant support system of the present invention shown over a barrel structure.

The description and operation of the invention will be best described with reference to FIG. 1. FIG. 1 is a perspective view of one version of the plant support system of the present invention shown over a barrel-shaped pot 21, shown in phantom. An elongate stake support 23 is shown to the right of the pot 21. Stake support 23, and all of the members recited herein can be clear and colorless, or translucently colored to a variety of hues to give the special effect sought to be displayed by a plant arrangement.

The elongate stake support 23 has a series of supports 25 extending from opposite sides of the elongate stake support 23. The elongate stake support 23 is so termed because one of its ends is formed into a point 27 to facilitate the insertion into soil 29 supported by the pot 21.

In FIG. 1, the supports are located on opposite sides of the elongate stake support 23 and all lie in a common plane. Note further that the distribution of the supports 23 on one side of the support 23 are offset with respect to the supports 23 on the other side of the support 23. The same is also true for other structural supports shown, which will be discussed below. Of course, any configuration is possible, but the offset configuration is believed to provide the greatest utility in positioning support to be applied to the plants.

At the top of the elongate stake support 23 is an angle connector 31 which connects the elongate stake support 23 to a elongate structural support 33. A pair of plants 39 and 37 are shown as growing from the soil 29 and are supported by the system of the present invention. Typically the system will be used for situations where a multitude of plants 39 and 37 will be growing, but only two are shown for clarity and to facilitate explanation thereof.

In the pot 21, four of the stake supports are shown, each capped with an angle connector 31. Each of the angle connectors is attached to a horizontal elongate structural support 33. At the center of the elongate structural support 33 is a four way connector 41 which joins the four horizontally disposed structural supports 33. Plants 39 and 37 is secured by a connector strap 43 which is engaged onto a strap support 25.

In practice, the additional plants in the pot 21 would be supported by the stake supports 23 as well as the structural supports 33. As can be seen, plants can be multiply supported to form a circular surface of plant support. With trimming and controlled growth, the system can provide even support about the periphery of the pot 21 as well as above the horizontally disposed structural supports 33.

Note how loosely the connector strap 43 surrounds the plant 39. The plant 39 has leaves 45 which can, since growth occurs slowly, be passed through the connector strap 43. Both the structural supports 33 and the stake supports 23 can have not only the square cross sectional area shown in FIG. 1, but a circular cross sectional area as well.

Figure 2:
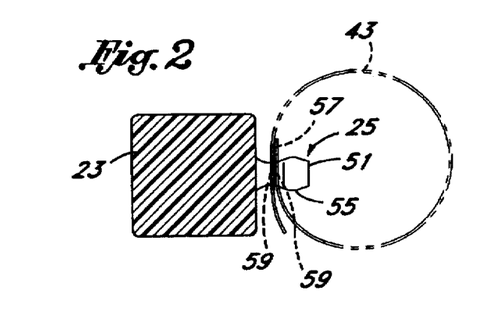
FIG. 2 is a sectional view taken along line 2—2 of FIG. 1 and illustrating a cross section of a rectangularly shaped stake support and its strap.

Referring to FIG. 2, a sectional view taken along line 2—2 of FIG. 1 illustrates the clear nature of the material, as well as an expanded view of the strap support 25. From its outermost end, the strap support 25 has an outer reduced diameter portion 51 which leads into a maximum diameter portion 55 and then to an inner reduced diameter portion 53 which is located between the main body of the strap support 25 and the maximum diameter portion 55.

As can be seen, the strap 43 has two of its ends overlapping and both fitted onto the strap support 25 by means of apertures 59. The design of the strap support 25 is such that the ends of the strap 43 can be loaded over the strap support 25 one at a time. This facilitates the securing of the plant. Once one end of the strap 43 is loaded onto the strap support 25, the plant 39 portion to be secured can be gently surrounded by the other end of the strap 43 and pressed into place onto the strap support 25.

The configuration shown in FIG. 2 illustrates an important aspect of the system of the present invention. The manual pressure brought to bear on the strap 43 against the strap support 25 is performed without placing any pressure on the plant 39 portion surrounded by the strap 43. This can be distinguished from tying, where pressure on the plant 39 portion is direct.

Figure 3:
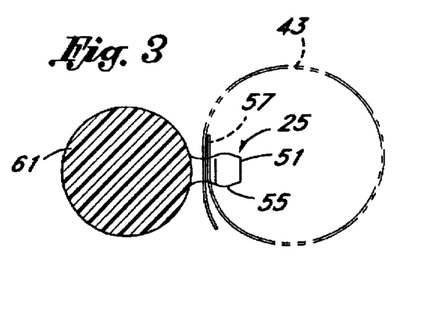
FIG. 3 is a sectional view similar to that shown in FIG. 2 but illustrating a cross section of a round stake support and its strap.

Referring to FIG. 3, an alternative embodiment, including a round (stake or structural) support 61 is shown as engaged with the strap 43. In both FIG. 3 and FIG. 2, the strap support 25 can be the same. Other differences between the round stake support 61 and the rectangular or square elongate stake support 23 will include the way that they bend light and show up in and among the plants. The round stake support 61 may have a tendency to focus light and to show up more prominently than the square elongate stake support 23.

Referring to FIG. 3A, an exploded view of the structures of FIG. 2 is shown. The aperture 59 of the strap 43 is shown, as is another shape variation of the stake support 25 is shown as a bulb shaped support 62, and includes outer reduced diameter portion 51, maximum diameter portion 55, and inner reduced diameter portion 53. The bulb shaped support 62 may be formed integrally with the round support 61 or it may be provided as a separate structure to be attached by gluing or other method, to a support such as support 61, 33 or 23. The rear surface of the support 62 may assume a shape compatible with the support to which it is to be attached.

Figure 4:
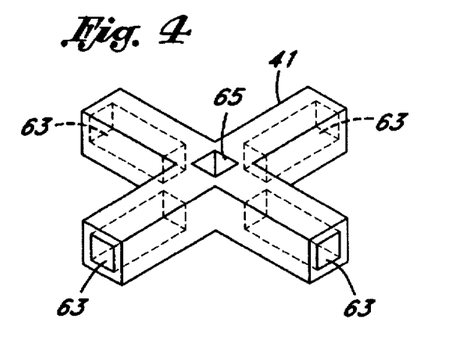
FIG. 4 is a perspective view illustrating the four way connector shown in FIG. 1.

Referring to FIG. 4, the four way connector 41 is shown in perspective view. The four way connector 41 has four legs in the same plane, each of which has an bore 63. In addition, a center aperture 65 will accept engagement by any rectangular elongate stake support 23 or non-stake support 33.

In terms of the fit, it is preferable for each bore 63 to have a slight frustrum shape in order to form a press fit with the flat end of any rectangular elongate stake support 23 or non-stake support 33. The alternative, having the flat end of the rectangular elongate stake support 23 or non-stake support 33 to be frustrum shaped would apply the maximum point of pressure at the mouth of each of the bores 63 which might cause splitting or spreading. By making the bore 63 frustrum shaped, the maximum point of stress will occur about half to two-thirds to three-fourths the way up the bore 63, a more preferable locale for pressure. The deeper within the bore 63 is the stopping point for the end of the support 23 or 33, the more stable the fit, and less angular displacement will be allowed.

Figure 5:
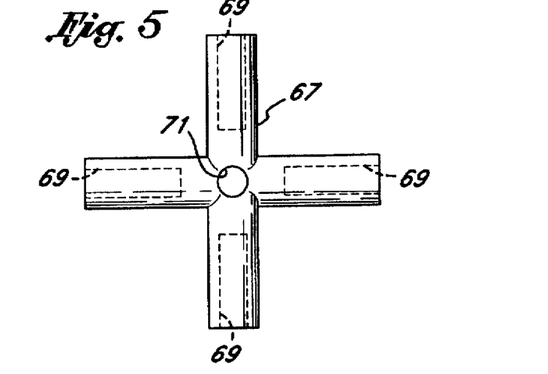
FIG. 5 is a plan view illustrating a four way connector for use with the round stake support of FIG. 3.

Referring to FIG. 5, a four way connector 67 is shown having rounded extension surfaces and including bores 69, and a central aperture 71. Connector 67 works in the same way as connector 41, and the apertures 69 would be expected to be gently internally tapered.

Figures 6, 7, 8:
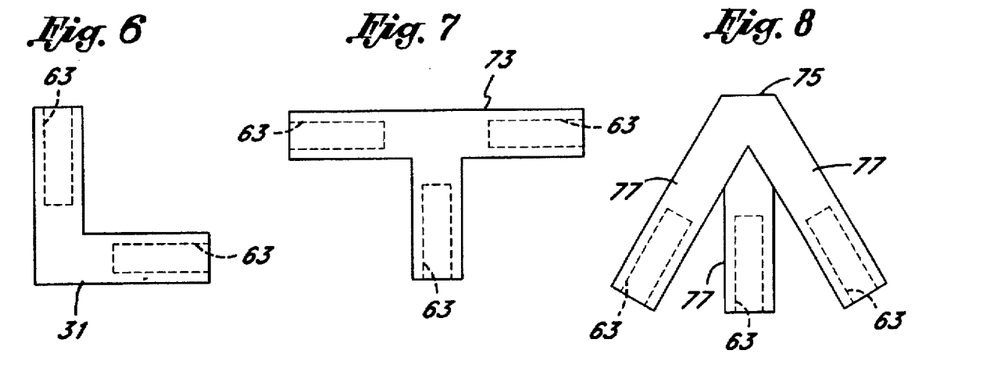
FIG. 6 is a plan view of the angle connector shown in FIG. 1.
FIG. 7 is a plan view of a "T" connector.
FIG. 8 is a plan view of a "TeePee" connector which when fitted with stake supports would direct them downwardly forming a TeePee structure.

Referring to FIG. 6, a plan view of angle connector 31 better illustrates the relative location of the bore 63. Other connectors are possible, such as the "T" shaped connector 73 shown in FIG. 7. Here, two of the bores 63 lie along the same axis, while a third bore 63 has an axis perpendicular to the axis for the first two.

Referring to FIG. 8, a TeePee connector 75 is shown with three downwardly directed members 77, each having a bore 63. Here, the TeePee connector 75 is shown with three downwardly directed members 77, but four, five, six or more may be used for more of an umbrella effect. The downwardly directed members 77 are evenly distributed about the central axis of the TeePee. The angular deviation from a planar orientation, shown for four way connector 67, can vary from a steep angle to a gently downward angle.

Figure 9:
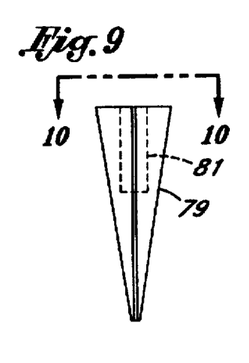
FIG. 9 is a plan view of an arrowhead connector utilizable with a non-pointed end support to facilitate insertion of the end support into the ground or soil.

Referring to FIG. 9, a four bladed point connector 79 is illustrated as having a four edged slot 81 which fits over the flat end of a elongate structural support 33 which was illustrated in FIG. 1. This four bladed point connector 79 can be used with one of the structural supports 33 to better enable it to be inserted into the soil. The connector 79 is made of two triangular expanses of material defining a seemingly sharpened point. The point is formed with respect to each triangle where two of the three sides of the triangle meet at a sharp angle of less than about 50°. The two expanses of material lie in planes which are approximately at right angles to each other but which may deviate from such right-angled relationship by up to about 20°. Because the slot 81 has four sides and plenty of space extending out between the blades, this structure can fit over either the round structural support 61, or the or square elongate stake support 23.

Figure 10:
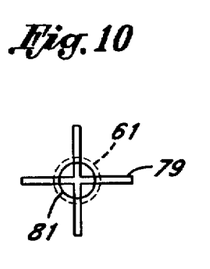
FIG. 10 is an end view of the arrowhead connector of FIG. 9.

Referring to FIG. 10, a top view, taken along line 10—10, with a round structural support 61 shown in dashed line format, inserted into the bladed point connector 79. The internal surface 81 of each blade immediately abuts the external surface of the outside of the round structural support 61. Alternatively, in the case of a square elongate structural support 33, it is the center of the square perimeters which would abut the internal surface 81.

Figure 11:
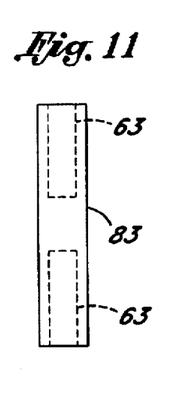
FIG. 11 is a plan view of a simple connector to connect two pieces of the support of the present invention.

Referring to FIG. 11, a connector 83, which is shown in plan view, contains a pair of oppositely oriented bores 63 along the same axis. The connector 83 can be of round or square cross section. Consequently the bores can be of any shape to match the outside surface of elongate structural support 33. In the case of FIG. 11, and for illustration, it is assumed that connector 83 is of square shape and that the bores are bores 63. A connector 83 which has a transition from a square external shape to a round external shape would probably show a transition midway along the length. If the connector 83 were round, the bores would be labeled 69 and there would be some shading as appears in FIG. 5.

Figure 12:
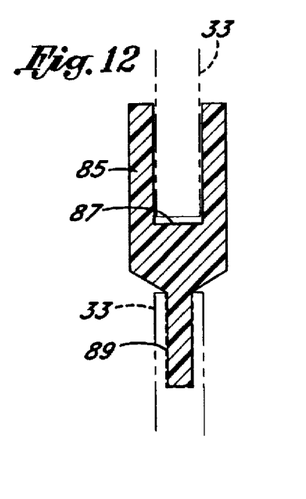
FIG. 12 is a sectional view of a "Y" connector which maybe used to connect two different lengths of the support of the present invention.

Referring to FIG. 12, a sectional view of a connector 85 illustrates a structure which could be used to interfit between two sizes of square elongate structural support 33 or two of the same size, or between two sizes of round structural support 61, or two of the same size, or between a round structural support 61 and a square elongate structural support 33. The support 85 includes a blind bore 87 and an extended pin 89. As illustrated in FIG. 12, the external width of square structural supports 33 joined are the same, but variations on this are contemplated.

Figures 13, 14, 15:
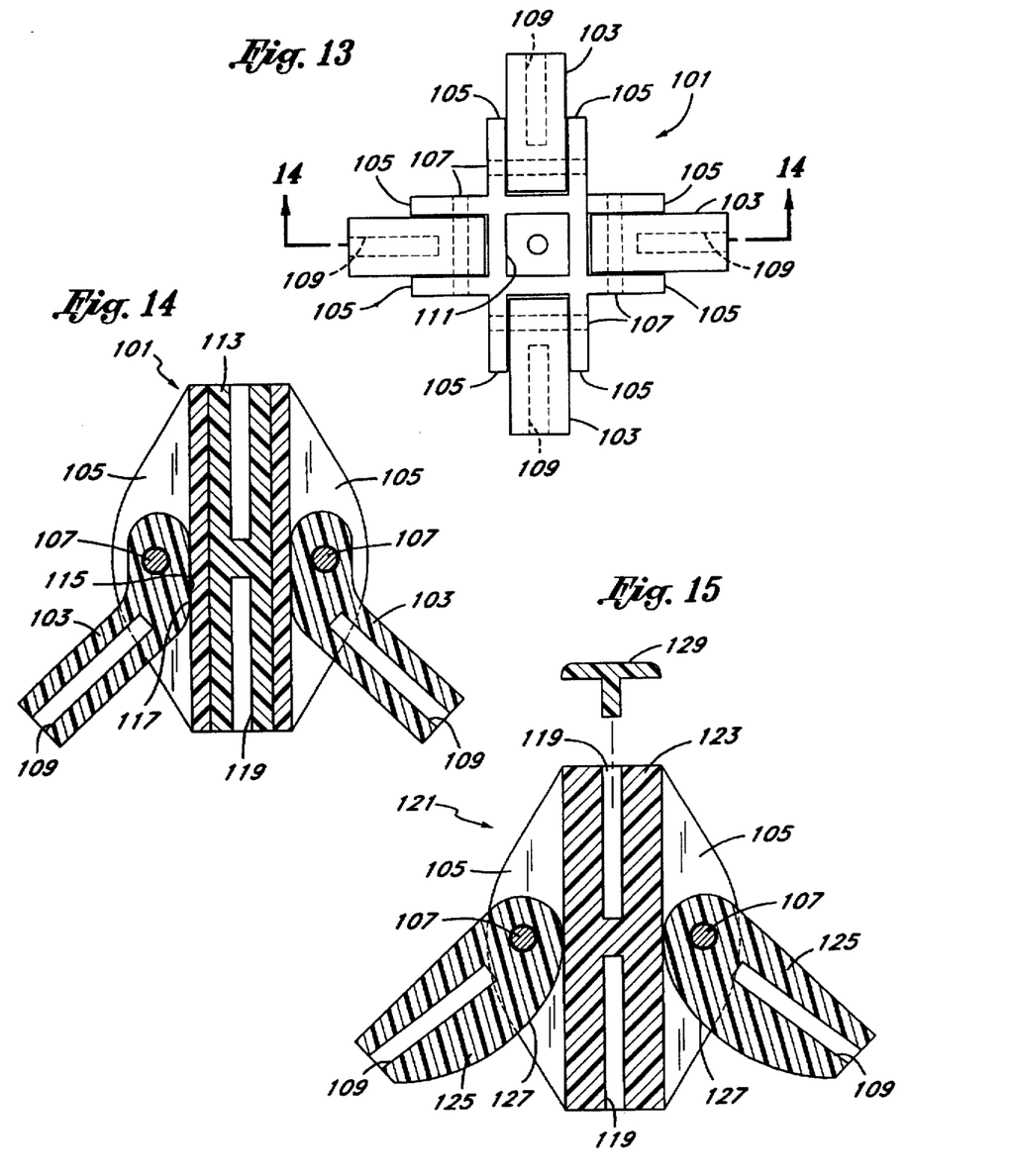
FIG. 13 is a top view of an angularly adjustable four sided connector which can be used to enable adjustment of the angles of connectors about a central axis.
FIG. 14 is a side sectional view of the angularly adjustable four sided connector of FIG. 13.
FIG. 15 is a side sectional view of a second embodiment of an angularly adjustable four sided connector as first shown in FIG. 13.

Referring to FIG. 13, a multiple hinged structure 101 is shown which has four hinged members 103, held in place by opposing pairs of flanges 105. Each hinged member 103 is held in place by means of a pin 107. The pin 107 may be press fit into an aperture (not shown in FIG. 13). Typically the hinged member 103 will have a bore which is larger than the pin 107 to allow easy pivoting about the pin 107.

The hinged member 103 carries a bore 109 similar to the bore 63 in the case of a square support 33, and similar to the bore 69 in the case of a round support 61. Hinged member 103 also has a square central bore 111 which can accept the square support 33. Where the hinged member 103 is fitted completely for use with the round support 61, the central bore 111 will be round. As before, the internal surface of central bores 111, and 109 have a gradually sloped surface which will interfit with either of the square supports 33 or round supports 61.

The multiple hinged structure 101 can be large enough to support the square support 33 or the round support 61 directly, or with the use of a connector 85. Where the multiple hinged structure 101 is required to be extra sturdy, the bores 109 can fit the structural supports 33 directly. Where less elongate structural support 33 is needed and dimensional aesthetics are important, the outside of the hinged members 103 can be made to be the same size as the elongate structural support 33.

Referring to FIG. 14, where a smaller connector 85 is used, the hinged member 103 can be fitted with an insert 113 which may or may not be identical to the connector 83 (see FIG. 11), to enable adaption to the proper sized member. The insert 113 will also preferably be press fit against the graduated internal surface of the hinged member 103. Regardless of size, the bores 109 should be gently tapered to enable an interference fit significantly far in from the mouth of the bores 109 to prevent any excess stress from being applied there.

The hinged member 103 is in the shape of a golf club, and has a flat portion 115 which opposes a flat surface 117. Thus, the hinged member 103 can pivot downwardly but only to a stop point where the flat surface 117 opposes flat portion 115. The insert 113 carries bores 119, and bores 119 may be of any size.

Referring to FIG. 15, a second embodiment of a multiple hinge member 121 is shown and which is similar to the multiple hinge member 101. Multiple hinge member 121, rather than have an insert, has its internal mass filled in to a level where smaller bores 119 are formed in the internal mass 123. The other structures are similar to those for multiple hinge member 101 except for the four hinge members. Here four hinge members are labeled 125, and rather than having a flat portion 115 opposing flat surface 117, hinge members 125 have a curved surface 127 which is shaped to place increasing amounts of pressure on flat surface 117 as the hinge member 125 is brought downwardly. Thus, downward movement is limited by the bearing and frictional pressure from the surfaces 117 and 127.

In addition, a cap member 129 may be supplied to block off the upper bore 119 opening for aesthetic reasons.

Figure 16:
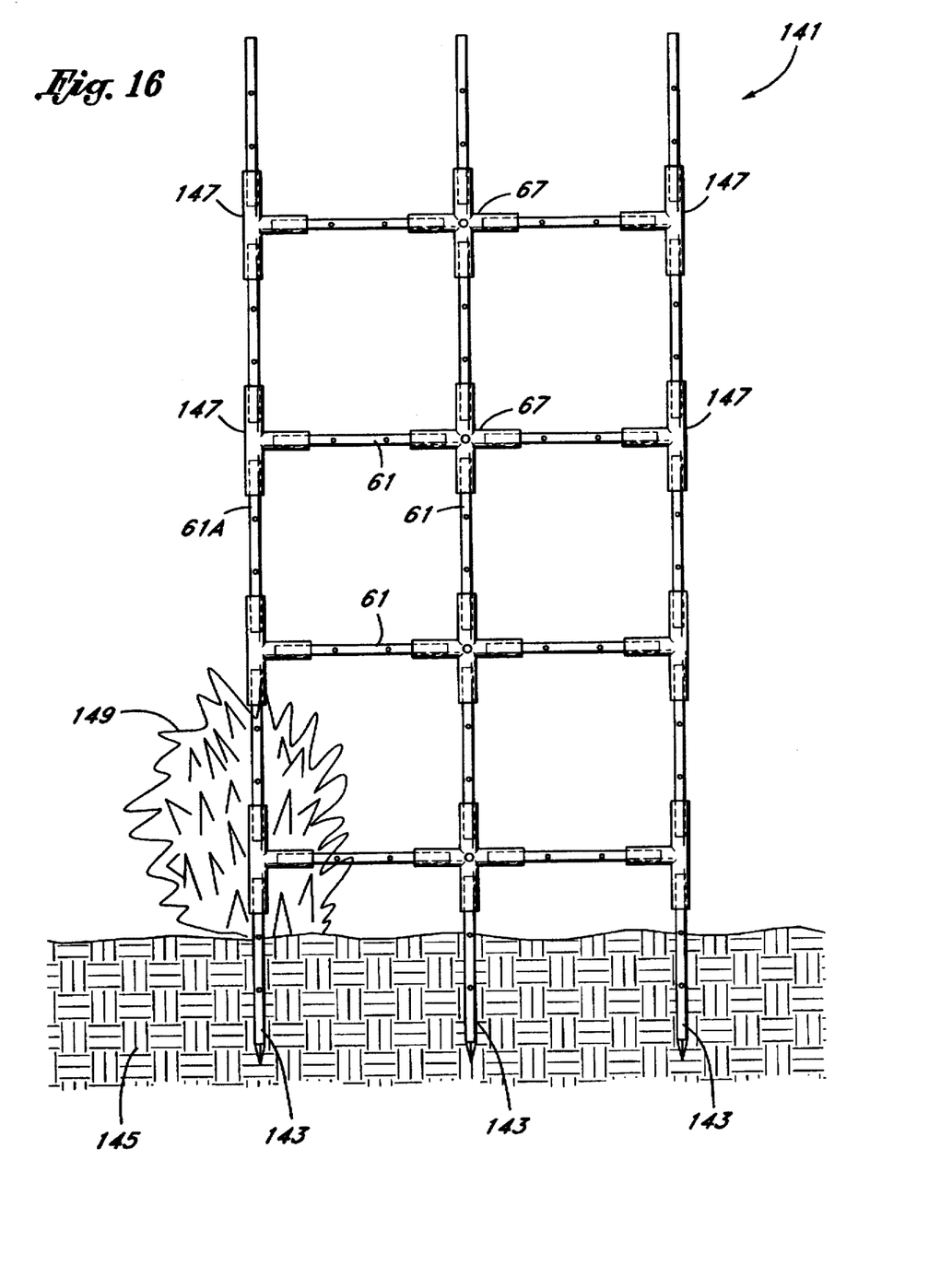
FIG. 16 is a plan view of a trellis which can be formed using the system of the present invention.

Referring to FIG. 16, one possible configuration for a trellis 141 is shown formed with the round supports 61 and the round four way connector 67. A series of round supports 61, with the four bladed point connector 79, similar to stake supports 23, except for the fact that they are round, are inserted into the ground 145. The other members are built onto the stake supports 23 using four way connectors 67 and "T" connectors 147.

The T connectors 147 are similar to the rectangular cross section T connectors 73, except they are round in order to accommodate the round structural supports 61. The Advantage of this configuration is that only the bottom level of round supports 61 need be added when the plants are of short height. As the plants grow, additional levels of structural supports 61 can be added with the appropriate connectors.

This system also helps in providing clearance at the top of the plant for trimming. A regular trellis, protruding through the center of a depth of plant would vastly complicate the trimming thereof. The trimming action must occur along the front half, and perhaps between the vertical members of a standard trellis if they exist. The half of the plant or bush behind the trellis is virtually impossible to reach with a trimmer and would cause great difficulty. Further, the additional trellis members can be added through various thicknesses of plants.

For example, even though the trellis 141 is shown in a stage higher than a plant 149, the plant 149 is positioned to show that the remaining height of the trellis, including the structural support 61A labeled for identification above the bush 149, could have been freshly inserted into the existing T connector 147 which was inside the perimeter of the growing plant 149.

Thus, the top of the growing plant 149 could be trimmed with a hedge trimmer, with no interference from the structure forming the trellis 147. Of course, once the strap support 25 has been engaged with connector strap 43, it may involve some effort in removing the connector strap 43 from around a growing plant, but the effort is more dependent upon how thick and/or thorny the plant or bush 149 becomes.

Referring to all of the Figures, the strap 25 will typically be located on the opposite sides of the structural supports 33 and 61, and the stake supports 23. Of course, the stake supports 23 could extend from all sides of the structural supports 33 and 61, and the stake supports 23. Since it is preferred that the supports be formed integrally with such structural supports 33 and 61, and the stake supports 23, the placement of the strap 25 on the opposite sides thereof will facilitate injection molding. This is because the maximum diameter portion 55 would tend to pull away from the inner reduced diameter portion 53 in the case of a standard two-part mold.

The alternative is to provide a series of holes in the structural supports 33 and 61, and the stake supports 23, and then to provide a series of insertable strap 25 which may be press fit or glued into place. However, it is preferable to form the supports integral since the structural integrity of the resulting structural supports 33 and 61, and the stake supports 23 will be enhanced.

Alternatively, the structural supports 33 and 61, and the stake supports 23 could be provided with through-bores into which two ended strap 25 can be inserted. Such a through-bore would further weaken the support into which it was formed. It is understood that the number of strap 25 which may be provided per unit length of the structural supports 33 and 61, and the stake supports 23 can vary as desired. Since these members can be rapidly injection molded the provision of a high density of strap 25 along their length may be desirable, particularly if a multiple variety of closely varying supports are to be made.

Although the structural supports 33 and 61, and the stake supports 23 are preferably made of a strong support material, and preferably clear, it is expected that the connector strap 43 may be made of a material which is strong and flexible, such as polypropylene or other material which will be enabled to fit over the supports 25 and provide long lasting support.

Figures 17, 18, 19, 20, 21, 22, 27:
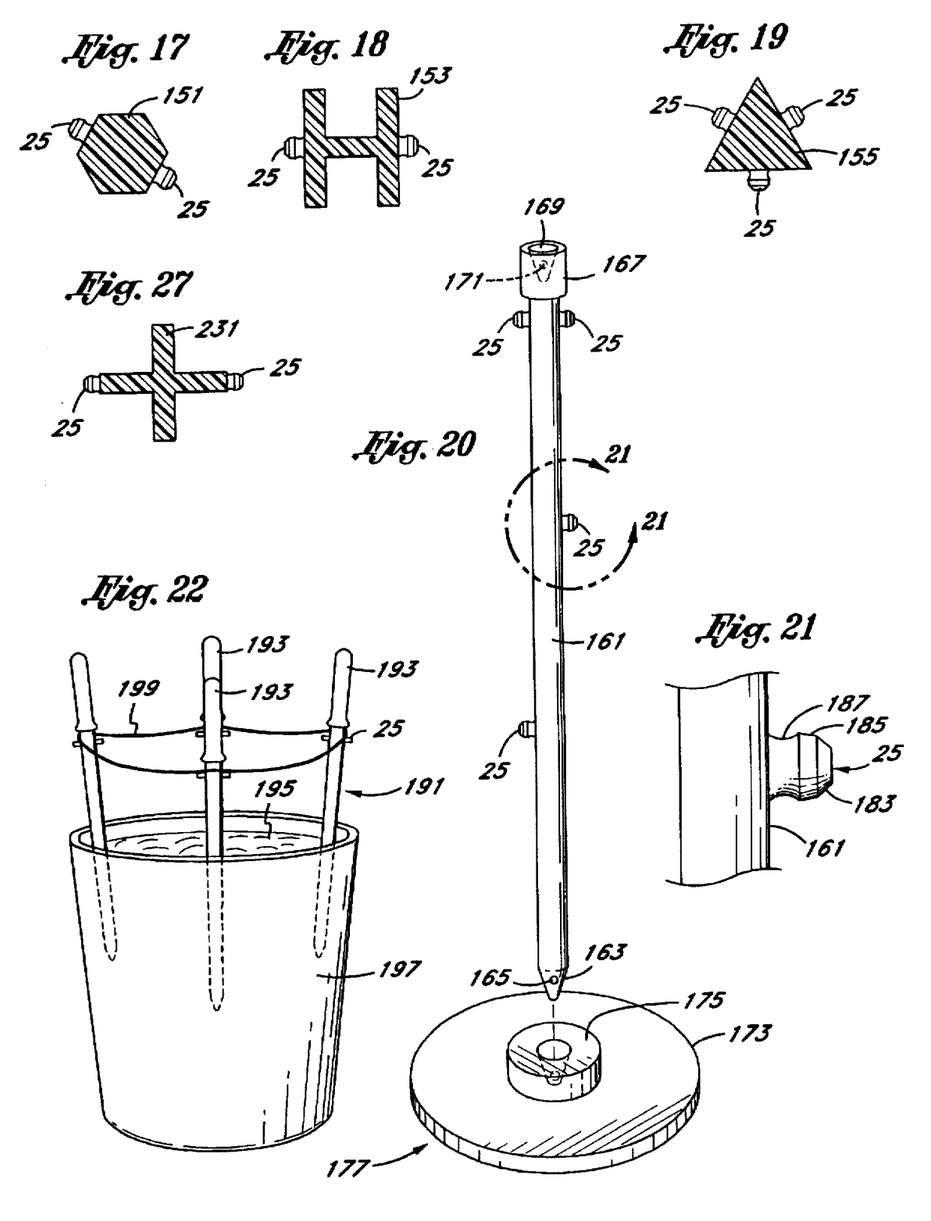
FIG. 17 is a cross sectional view of a member having a hexagonal cross section with oppositely oriented supports.
FIG. 18 is a cross sectional view of a member having an "H" cross sectional shape with oppositely oriented supports.
FIG. 19 is a cross sectional view of a member having a triangular cross sectional shape and which can have from one to three supports.
FIG. 20 is a side view of a round member but having connectors which enable the round member to act as both a stake and a support, and including a base member from which the round member can engage and depend for support.
FIG. 21 is an expanded side view of a second version of the supports utilizable in conjunction with the structural support system of the present invention.
FIG. 22 is a perspective view of a pot containing soil and having a series of handled strap stakes inserted into the soil.
FIG. 27 illustrates a cross sectional view of a member having a cross shaped cross sectional shape.

In addition to the square and round members shown in FIGS. 1–16, a variety of other cross sectional shapes are possible. Referring to FIG. 17, a hexagonally shaped member 151 has oppositely oriented strap 25. The hexagonal shape of the member 151 gives a gem effect to light entering and leaving the member 151. This cross sectional shape not only provides more than adequate structural support, but also accentuates the play of light on or through the member 151. The opposite orientation of the strap 25 again facilitates the manufacture of the member 151 by providing a bi-lateral symmetry which can easily be removed from an injection mold.

Referring to FIG. 18, an "H" shaped member 153 has oppositely oriented strap 25. The "H" shape of the member 153 enables enhanced structural support with less material consumed in manufacture. Although the shape drawn is an "H" shape having squared lines meeting at right angles, a variation on this "H" shape may entail gentler sloping intersecting surfaces. The relaxation on the complete right angled intersection may further facilitate manufacture by making the member 153 easier to remove from the injection mold. Again, the opposite orientation of the strap 25 again facilitates the manufacture of the member 151 by providing a bi-lateral symmetry.

Referring to FIG. 19, a triangular shaped cross section is demonstrated in a member 155. In this case, the presence of three strap 25 in a non-bilaterally symmetrical member may require additional manufacturing considerations, but the member 155 can be made with strap 25 existing on a single side of the member 155. In this case, the bi-lateral symmetry is preserved and manufacturing is again facilitated.

Alternate configurations for connectability of the members 23, 33, 61, 151, 153, and 155 can also be achieved. Referring to FIG. 20, a round support member 161, is used as an example. The round support member 161 has a lower, somewhat pointed end 163 having a small projection 165. The round support member 161 has an upper, somewhat substantiated connector portion 167. The connector portion 167 has a space 169 which generally mates with the pointed end 163 of the member 161. A small void 171 is provided which will interfit with and engage small projection 165 when a structure having the shape of pointed end 163 is brought into interfitting contact with the connector portion 167.

The advantage of this configuration is that both a stake and connector system is provided simultaneously. The end 163 can be used to stake the member 161 into the ground, the small projection 165 providing minimal additional resistance over a standard point shaped end. In fact, the lower most end of the member 161 can be made to any sharpness, although a slightly blunted end would increase safety without a considerable increase in loss of utility as a soil jabbing structure.

Further, the configuration of FIG. 20 can just as easily be used as a horizontal structural support, such as horizontal structural support 33. A system embodying the structures on member 161 can be used with connectors (to be shown) to build the trellis shown in FIG. 16.

Referring still to FIG. 20, and at the bottom of the figure, a planar support 173 is shown having a smaller round connector boss 175 at its center. The connector boss 175 also has the small void 171 which mates with the small projection 165. In this configuration, the expanded surface area occupied by the connector boss 175 ensures a good bond with the planar support 173. The combination of the planar support 173 and round connector boss 175 form a horizontal support 177.

Referring to FIG. 21, a closeup taken about detail line 21–21 of FIG. 20 illustrates a more detailed and alternate design for the strap 25 of the present invention. Rather than have an outer reduced diameter portion 51, maximum diameter portion 53, and inner reduced diameter portion 55 as was shown in FIGS. 2 and 3, the strap 25 may have a first frusto-conic section portion 183 having a more severe angle with respect to the axis of the strap 25, bounded by a second frusto-conic section portion 185 having a lesser angle of severity with respect to the axis of the support 25, and finally leading to a curved neck portion 187 having a concave side profile as depicted in FIG. 21.

Referring to FIG. 22, a slightly different version of the round support member 161 is shown as a handled strap stake 191. Art upper handle 193 overlies the strap 25 to facilitate the manual insertion of the handled strap stake 191 into soil. The lower ends of the handled strap stake 191 are identical to the lower end 163 of the round support member 161, and thus may include the small projection 165. The handled strap stakes 191 are shown inserted into soil 195 supported by pot 197. A length of support line 199 is shown engaged about four such stakes as one possible configuration. In the alternative, the support line 199 may be individual lengths of a connector strap 43, or one continuous connector strap. In this configuration, one connector strap may connect with several handled strap stakes 191.

Figure 23:
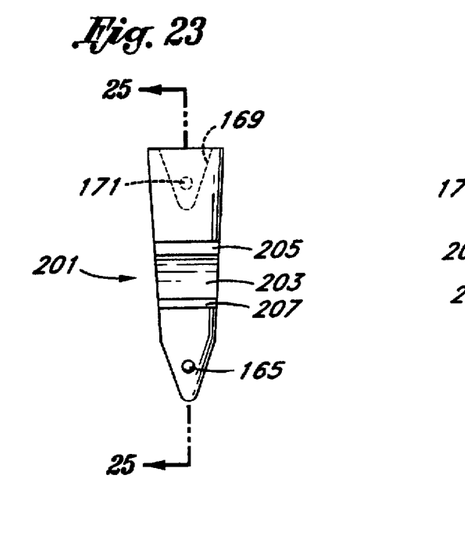
FIG. 23 is a plan view of a cross connector and illustrating an open bore, small projection, and a matching small void.

Referring to FIG. 23, a tipped cross connector 201 is illustrated. The connector 201, like the substantiated connector portion 167 has an upper portion defining a space 169 having a small void 171. The lower end of the connector 201 has a small projection 165. Thus, the connectors 201 can be snapped together, one end into the other to form a chain. However, the most preferable use is as an extension to the end of round support member 161, planar support 173.

The middle of the connector 201 has an open bore 203 bounded by an upper angled lip 205 and a lower angled lip 207 to help guide the surface of a round support member 161 into an interlocking relationship within the open bore 203. With this configuration, the connector 201 serves to not only connect two separate round support members 161, but also to provide the ability to connect the two separate round support members 161 to a horizontally extending member, which may also be a separate round support member 161.

Figures 24, 26:
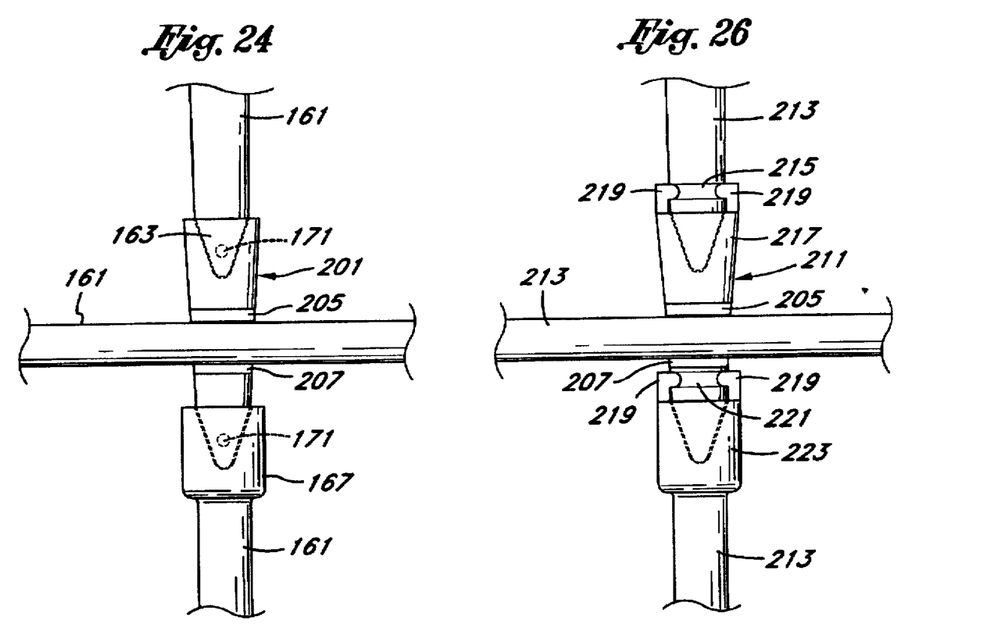
FIG. 24 illustrates the cross connector of FIG. 23 in conjunction with connected round support members.
FIG. 26 illustrates a second embodiment of a cross connector utilizing engagement arms displaced from the area of mating connection.

Referring to FIG. 24 this arrangement is shown where a pointed end 163 of a round support member 161 is inserted into a space 169 of the connector 201, where the connector 201 tip end is inserted into a substantiated connector portion 167 of a round support member 161. A length of round support 161 is shown at a right angle to the other two round connectors 161, and held within the open bore 203. As can be seen, the connector 201 can engage a round support member at any point along the length of the round connector 161 which enables a picket of variously spaced, vertically extending interconnected round connectors to depend from one or more horizontally oriented round supports 161. The trellis shown in FIG. 16 can thus be constructed from a series of round supports 161 and connectors 201.

Figure 25:
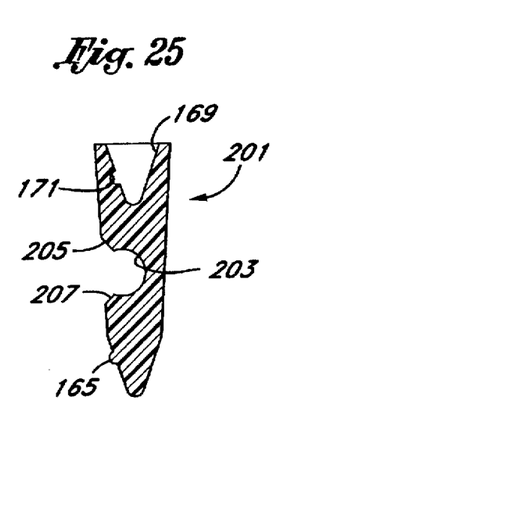
FIG. 25 is a cross sectional of the cross connector of FIGS. 23 and 24 illustrating additional details of the open bore, small projection, and a matching small void.

FIG. 25 illustrates a cross sectional view of the connector 201 which illustrates the physical extent of the open bore 203, the small void 171, and the small projection 165. From a radial perspective, the void 171 and projection 165 need not lie within a radial plane perpendicular to the axis of the open bore 203, nor do void 171 and projection 165 need lie within a common radial plane. The arrangement of FIG. 25 is configured for illustration purposes only.

Referring to FIG. 26, a slightly different embodiment of the connector 201 is shown in the form of a connector 211. The connector 211 works in conjunction with a round support 213 having a groove 215 encircling the round support 212 near a tip end of the round support 213. The connector 211 has a round portion 217 into which the tip end of connector 211 fits. Connector 211 has a pair of engagement arms 219 which are oppositely disposed and extend above the round portion 217 of connector 211 so that the engagement arms 219 can flex slightly to engage the groove 215. The open bore 203 of the connector 211 has structures identical with those same structures located on connector 201.

The lower end of connector 211 has a groove 221 which is of the same type and diameter profile as the groove 215, and located near the tip end of the connector 211. The connector 211 is shown engaging a round support 213 having a substantiated connector portion 223. A horizontally oriented round support 213 is shown secured by the connector 211, in an orientation similar to that shown in FIG. 24.

The location of the engagement arms 219 in a position displaced from the enclosed volume securing the tip end of either the round support 213 or the tip end of the connector 211 enables flexibility in design, especially where selection of materials is concerned. Where relatively harder and relatively inflexible materials are used, there may be little deformation which would allow engagement within a closed space. Conversely, softer and more deformable materials will enable the use of a design where the engagement arms 219 may be the preferable mode of attachment.

Referring to FIG. 27, a cross shaped cross sectional configuration is shown for a cross shaped member 231 and has oppositely oriented strap 25. The cross shape of the member 231 can also give a gem effect to light entering and leaving the member 231. The cross shaped member 231 can operate with the connector 201 especially since the small projection 165 and small void 171 can still be used in conjunction with this shape. In this case, it is preferable for the space 169 of either the substantiated connector portion 167 or the connector 201 to conform to the shape of the member, whether it be member 231, 151, 153, or 155.

In all cases, the tip ends of the members 231, 151, 153, or 155 can be made into a point and fit nearly exactly as shown in FIGS. 20–26. The small projection 165 could be located on member 151 in any radial position, but with the "H" shaped member 153, the projection would most likely lie on the horizontal connection portion of the "H" member. The triangular shaped member 155 would most likely be rounded, as would be the hexagonal shaped member 151, and the small projection could be located in any radial plane.

This cross sectional shaped member 231 not only provides more than adequate structural support, but also accentuates the play of light on or through the member 231. The opposite orientation of the supports 25 again facilitates the manufacture of the member 231 by providing a bi-lateral symmetry which can easily be removed from an injection mold.

While the present invention has been described in terms of a structural support system for plants, one skilled in the art will realize that the structure and techniques of the present invention can be applied to many such structural appliances. The present invention may be applied in any situation where a multiple number of quick attach and quick release mechanism are to be provided.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A plant support comprising:
   an elongate member having a pointed first end and having a small projection extending from said first end, a second end having a substantiated connector portion and having a space having a small void complementary in size to said small projection such that a first elongate member can be attached to a second elongate member by connecting a first end of said first elongate member to a second end of said second elongate member; said elongate member carrying a plurality of strap supports extending therefrom generally away from an axis of said elongate member extending between said first end and said second end.

2. The plant support as recited in claim 1 wherein said plurality of strap supports are distributed in a single plane and on first and opposite sides of said axis.

3. The plant support as recited in claim 2 wherein said strap supports are distributed on a first side of said axis and on a second side of said axis in an offset manner with respect to the supports on said first side of said axis.

4. The plant support as recited in claim 2 wherein said strap supports extend generally away from the axis of said elongate member and further comprise a first frusto-conic section portion having a first angle with respect to an axis of said strap support and forming the outermost portion of said strap support, a second frusto-conic section portion adjacent said first frusto-conic section having a second angle with respect to an axis of said strap support smaller than said first angle, and a curved neck portion having a first end connected to said second frusto-conic section and a second end connected to said elongate member.

5. The plant support as recited in claim 1 wherein said plurality of strap supports each has an inner reduced diameter portion adjacent said elongate member; a maximum diameter portion having a diameter larger than said inner reduced diameter portion and adjacent said inner reduced diameter portion; and an outer reduced diameter portion adjacent said maximum diameter portion and having a diameter smaller than said maximum diameter portion and wherein said elongate member has an "H"-shaped cross section.

6. The plant support as recited in claim 5 and further comprising a length of strap having a plurality of spaced apart apertures sized to fit over said outer reduced diameter portion of said strap supports and to be forced over said maximum diameter portion of said strap supports and to rest in said inner reduced diameter portion of said strap supports.

7. The plant support as recited in claim 1 wherein said plurality of strap supports each has an inner reduced diameter portion adjacent said elongate member; a maximum diameter portion having a diameter larger than said inner reduced diameter portion and adjacent said inner reduced diameter portion; and an outer reduced diameter portion adjacent said maximum diameter portion and having a diameter smaller than said maximum diameter portion and wherein said elongate member has a hexagonal-shaped cross section.

8. The plant support as recited in claim 1 wherein said plurality of strap supports each has an inner reduced diameter portion adjacent said elongate member; a maximum diameter portion having a diameter larger than said inner reduced diameter portion and adjacent said inner reduced diameter portion; and an outer reduced diameter portion adjacent said maximum diameter portion and having a diameter smaller than said maximum diameter portion and wherein said elongate member has a cross-shaped cross section.

9. The plant support recited in claim 1 and further comprising a horizontal support having a planar support and a connector boss supported by said planar support, said connector boss having a space having a small void complementary in size to said small projection such that said elongate member can be attached to said connector boss to lend support to said elongate member.

10. A plant support comprising:

a plurality of elongate members having a plurality of strap supports extending therefrom, said strap supports further having an inner reduced diameter portion adjacent said elongate member; a maximum diameter portion having a diameter larger than said inner reduced diameter portion and adjacent said inner reduced diameter portion; and an outer reduced diameter portion having a diameter smaller than said maximum diameter portion;

a length of strap having a plurality of spaced apart apertures sized to fit over said outer reduced diameter portion of said strap supports and to be forced over said maximum diameter portion of said strap supports and to rest in said inner reduced diameter portion of said strap supports and wherein said plant support includes a trellis in a barrel planter configuration for use with a barrel planter having soil further comprising:

a four way connector having first and second bores having a first common axis and third and fourth bores having a second common axis perpendicular to said first common axis;

a first one of said plurality of elongate members having a first pointed end and a second end;

a first angled connector having a first bore and a second bore into which is fitted said second end of said first one of said plurality of elongate members;

a second one of said plurality of elongate members having a first pointed end and a second end;

a second angled connector having a first bore and a second bore into which is fitted said second end of said second one of said plurality of elongate members;

a third one of said plurality of elongate members having a first pointed end and a second end;

a third angled connector having a first bore and a second bore into which is fitted said second end of said third one of said plurality of elongate members;

a fourth one of said plurality of elongate members having a first pointed end and a second end;

a fourth angled connector having a first bore and a second bore into which is fitted said second end of said second one of said plurality of elongate members; said second end of said first one of said plurality of elongate members connected into said first bore of said four way connector, said second end of said second one of said plurality of elongate members connected into said second bore of said four way connector, said second end of said third one of said plurality of elongate members connected into said third bore of said four way connector, said second end of said fourth one of said plurality of elongate members connected into said fourth bore of said four way connector, said first pointed ends of said first, second, third and fourth one of said plurality of elongate members to facilitate insertion into said soil.

* * * * *